United States Patent
Teshima et al.

(10) Patent No.: US 7,579,938 B2
(45) Date of Patent: Aug. 25, 2009

(54) VEHICULAR CONTROL SYSTEM

(75) Inventors: Kentarou Teshima, Kariya (JP);
Kazuhiro Nakashima, Kariya (JP);
Kenichi Ogino, Toyota (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 11/790,787

(22) Filed: Apr. 27, 2007

(65) Prior Publication Data
US 2007/0290794 A1    Dec. 20, 2007

(30) Foreign Application Priority Data
Jun. 19, 2006    (JP)    ............... 2006-169120

(51) Int. Cl.
*G05B 19/00*    (2006.01)
(52) U.S. Cl. ............... 340/5.72; 340/539.2; 340/539.1; 340/426.1; 340/426.13; 340/426.16; 340/426.17; 340/539.11; 340/10.3; 340/10.5; 340/10.1; 701/2; 701/49; 701/36
(58) Field of Classification Search ............ 340/539.32, 340/539.1, 539.11, 425.5, 426.1, 426.13, 340/426.16, 426.17, 426.18, 10.3, 10.5, 10.1, 340/5.71, 5.72; 307/10.2, 10.3; 701/2, 49, 701/36
See application file for complete search history.

(56) References Cited

U.S. PATENT DOCUMENTS

| | | | |
|---|---|---|---|
| 5,563,453 A * | 10/1996 | Nyfelt ................. | 307/10.2 |
| 5,602,535 A * | 2/1997 | Boyles et al. ............... | 340/5.22 |
| 5,619,191 A * | 4/1997 | Lambropoulos et al. ... | 340/5.22 |
| 5,896,094 A * | 4/1999 | Narisada et al. ............ | 340/5.64 |
| 6,304,168 B1 | 10/2001 | Ohta et al. | |
| 6,744,364 B2 * | 6/2004 | Wathen ................... | 340/539.1 |
| 7,400,243 B2 * | 7/2008 | Sumida et al. ......... | 340/539.11 |
| 2004/0183655 A1 | 9/2004 | Takata | |
| 2005/0242923 A1* | 11/2005 | Pearson et al. ............. | 340/5.62 |
| 2006/0012462 A1 | 1/2006 | Teshima et al. | |
| 2006/0186993 A1* | 8/2006 | Inoue ........................ | 340/5.72 |
| 2007/0040650 A1* | 2/2007 | Handley et al. ............ | 340/5.64 |
| 2007/0229219 A1* | 10/2007 | Nakashima et al. ........ | 340/5.61 |

FOREIGN PATENT DOCUMENTS

| | | |
|---|---|---|
| DE | 102 21 511 | 11/2003 |
| DE | 10 2004 042 112 | 3/2005 |

OTHER PUBLICATIONS

German Office Action dated Dec. 11, 2008 issued in corresponding German Application No. 10 2007 020 802.4-51 with English Translation.

* cited by examiner

*Primary Examiner*—Daryl C Pope
(74) *Attorney, Agent, or Firm*—Nixon & Vanderhye PC

(57) ABSTRACT

After a door of a vehicle is locked, a touch switch and a lock switch is disabled for a predetermined time period. A predetermined operation of a holder of a handheld unit to a door handle during the predetermined time period causes a device mounted in the vehicle to perform a certain function other than unlocking the door. Thus the predetermined operation solely to the door handle after the door of the vehicle is locked can serve as an instruction for the device mounted in the vehicle to execute the certain function.

8 Claims, 2 Drawing Sheets

VEHICULAR CONTROL SYSTEM

CROSS REFERENCE TO RELATED APPLICATION

This application is based on and incorporates herein by reference Japanese Patent Application No. 2006-169120 filed on Jun. 19, 2006.

FIELD OF THE INVENTION

The present invention relates to a vehicular control system, in which a handheld unit and an in-vehicle system communicate with each other and a device provided in the vehicle is controlled based on the communication result.

BACKGROUND OF THE INVENTION

Patent document 1 discloses a system, in which a handheld electronic key and an in-vehicle system communicate with each other to collate an ID code and a door of the vehicle is locked/unlocked based on the collation result. In the system, a transmitter of the in-vehicle system has given detection areas outside and inside of the vehicle and transmits request signals within the detection areas with given intervals. Thus, the system monitors a holder of the handheld unit, who approaches the vehicle or gets in/out the vehicle.

For instance, the holder of the handheld unit approaches the vehicle for getting in and enters the detection area. Then, upon receiving a request signal, the handheld unit transmits to the in-vehicle system a response signal including an ID code. When the in-vehicle system verifies the ID code, e.g., determines that the received ID code accords with a registered ID code, it sends a control signal to a door control unit for each door to be in a standby state ready for unlock. In the standby state, a touch sensor in a door handle is supplied with an electric current, which allows detection of the holder who touches the door handle. When the touch sensor detects an operation for the holder to touch the door handle, the door control unit unlocks each door.

Further, when the engine of the vehicle stops and the holder gets out the vehicle, the handheld unit is located in the detection area outside of the vehicle. Thus, when the ID code of the handheld unit is verified and a door lock switch nearby the door handle is then operated, the door is locked.

In the above system, the holder of the handheld unit can lock/unlock the door without actually holding the handheld unit by hand. This increases user's convenience.

For instance, the holder of the handheld unit may remain nearby the vehicle, e.g., when the holder washes or fixes the vehicle. In this case, the in-vehicle system transmits request signals to the detection area outside of the vehicle with intervals. Thus, the handheld unit nearby the vehicle frequently returns response signals to the in-vehicle system and the in-vehicle system collates the ID code. This consumes electric power in both the handheld unit and in-vehicle system. Further, a water splash due to washing the vehicle may reach the door handle to thereby activate the touch sensor and resultantly release the door lock of the vehicle.

Furthermore, the vehicle may include a security unit for preventing a theft of the vehicle. The security unit has a sensor to detect vibrations or sounds arising from a force applied to the parked vehicle and output an alarm. Such a security unit is typically activated to monitor when the occupant gets out the vehicle and locks the door.

However, for instance, when the vehicle is washed by the holder, the security unit may unnecessarily output the alarm in response to the vibrations or sounds. The security unit is typically designed to have a switch for turning on/off; however, the switch is provided inside of the vehicle. Therefore, to operate the switch inside the vehicle for tuning off the system is burdensome.

Patent document 1: JP-2006-28838 A (US-2006/0012462 A1)

SUMMARY OF THE INVENTION

It is an object of the present invention to provide a vehicular control system to instruct a device in the vehicle such as an in-vehicle system or security unit to perform a certain function, such as disabling an activation, via a simple operation.

According to an aspect of the present invention, a control system for a vehicle is provided as follows. An in-vehicle system is provided in the vehicle and configured to transmit a request signal. A handheld unit is configured to return a response signal including an ID code in response to the request signal. The in-vehicle system comprises: a collating unit configured to perform a collation of the ID code from the handheld unit; a lock instruction unit to be operated by a holder of the handheld unit for issuing a lock instruction to lock a door of the vehicle; an unlock instruction unit provided in a door handle of the vehicle to be operated by the holder for issuing an unlock instruction to unlock the door when the ID code is verified in the collation performed by the collating unit; a disabling unit to disable the unlock instruction issued by the unlock instruction unit from when the door is locked based on the lock instruction to when a predetermined time period elapses, the predetermined time period starting from when the door is locked based on the lock instruction; and a function instruction unit configured to (i) detect a predetermined operation to the door handle by the holder while the unlock instruction is disabled and (ii) instruct a certain device in the vehicle to execute a certain function other than unlocking the door when the predetermined operation is detected.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
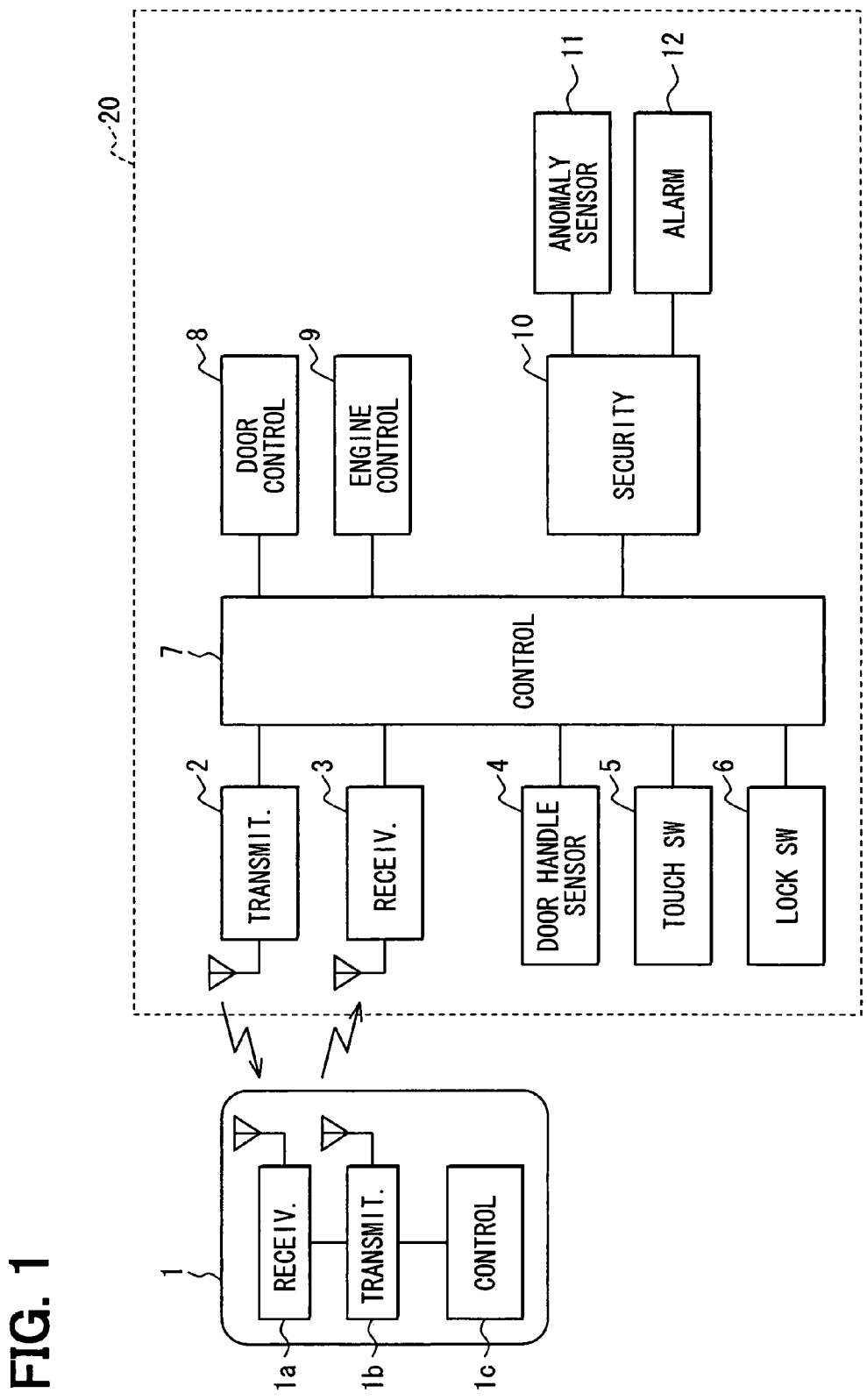
FIG. 1 illustrates an overall configuration of a vehicular control system according to an embodiment of the present invention.

A vehicular control system according to an embodiment of the present invention will be explained below. FIG. 1 illustrates an overall configuration of the control system for a subject vehicle. In the control system, an in-vehicle system 20 mounted in the vehicle and a handheld unit 1 communicate with each other to collate an ID code, and, based on the collation result, lock/unlock of each door of the vehicle or permission/prohibition of engine start is controlled. Further, the in-vehicle system 20 includes a security unit 10 for preventing a theft of the vehicle or the like and an engine control unit 9, both of which will be explained later.

As shown in FIG. 1, the in-vehicle system 20 includes a control unit 7 and transmitters 2. Although only one transmitter 2 is illustrated in FIG. 1, the transmitters 2 are actually provided to individual doors and individual locations inside of the vehicle. These transmitters 2 transmit request signals based on a transmission instruction from the control unit 7.

For instance, when the engine of the vehicle is stopped and the vehicle is parked with each door locked, the control unit 7 instructs the transmitter 2 provided to each door to transmit request signals with given intervals towards outside of the vehicle. Further, when a holder of the handheld unit 1 touches a door outside handle (i.e., door handle) provided to each door, the control unit 7 instructs the transmitter 2 to transmit the request signals towards outside of the vehicle.

Thus, the control unit 7 of the in-vehicle system 20 severs as a polling unit and a trigger unit to have a polling function and a trigger function. The polling function is to transmit request signals with given intervals when the vehicle is parked with each door locked for detecting whether the holder of the handheld unit 1 approaches the vehicle. The trigger function is to issue a trigger signal to start transmitting request signals when the holder of the handheld unit 1 performs an operation requiring for unlocking each door.

Further, the transmitter 2 provided inside of the vehicle is instructed to transmit request signals when (i) the door of the driver's seat is opened or closed, (ii) the engine is started, (iii) a door lock switch 6 is operated, or the like. Whether the handheld unit 1 is located inside of the vehicle is detected depending on presence/absence of a response signal replying to a request signal transmitted towards inside of the vehicle.

The handheld unit 1 includes a transmitting/receiving circuit having a receiver 1a and a transmitter 1b. The receiver 1a receives a request signal from the transmitter 2 of the in-vehicle system 20. The transmitter 1b transmits a response signal including an ID code or the like in reply to the request signal. The receiver 1a and transmitter 1b are connected with a control unit 1c, which controls the receiver 1a and transmitter 1b. For instance, the control unit 1c determines whether a request signal is present, based on a reception signal of the receiver 1a, and generates a response signal including the ID code or the like to cause the transmitter 1b to transmit it. Furthermore, the handheld unit 1 has a battery (not shown).

The in-vehicle system 20 includes a receiver 3. The receiver 3 moves in a state, in which a response signal can be received, in synchronization with a transmission instruction signal outputted from the control unit 7 to the transmitter 2. Thus, the response signal from the handheld unit 1 can be received. The response signal received by the receiver 3 is outputted to the control unit 7. The control unit 7 serves as a collating unit to determine whether the ID code in the received response signal satisfies a predetermined condition, i.e., whether the ID code in the received response signal accords with a previously registered ID code. This is referred to as an ID code collation or ID code determination.

Next, communication between the handheld unit 1 and the in-vehicle system 20 will be explained below. The following describes an example, in which the handheld unit 1 and in-vehicle system 20 communicate with each other when the transmitter 2 transmits a request signal towards outside of the vehicle.

The transmitting/receiving circuit of the handheld unit 1 remains in a sleep state until the communication starts. To that end, the transmitter 2 transmits a first request signal for waking up the transmitting/receiving circuit of the handheld unit 1. The handheld unit 1 is waked up based on the first request signal and then replies as a first response signal an acknowledge signal (i.e., ACK signal). When the receiver 3 of the in-vehicle system 20 receives the ACK signal, the transmitter 2 transmits a signal including a vehicular ID code unique to each vehicle as a second request signal. The handheld unit 1 replies as a second response signal an ACK signal again when having a vehicular ID code identical to the vehicular ID code transmitted from the in-vehicle system 20.

When the receiver 3 receives the ACK signal replying to the vehicular ID code, the transmitter 2 transmits as a third request signal a signal including a code unique to each of the transmitters 2. The handheld unit 1 prepares a response code by using the code included in the third request signal and transmits as a third response signal the prepared response code along with a previously stored ID code. Here, when the transmitter 2 transmits the first or second request signal and the handheld unit 1 then returns no response signal, the in-vehicle system 20 regards that no handheld unit 1 is present within the detection area and terminates the communication.

As explained above, the response code is prepared by using a code unique to each of the transmitters 2. The control unit 7 can therefore detect, based on the response code, a transmitter 2 having transmitted a request signal which the handheld unit 1 replies to.

A door handle of each door of the vehicle has a touch switch 5, which is able to detect that the holder of the handheld unit 1 touches the door handle. Further, the door handle has a push-type door lock switch 6. When the door lock switch 6 is operated and it is determined that the ID code is verified outside of the vehicle, each door of the vehicle is unlocked.

Each door of the vehicle has a door control unit 8 for controlling lock/unlock of each door. The door control unit 8 operates based on the instruction signal from the control unit 7. Here, alternatively, the door control unit 8 can be integrated into the control unit 7 as one unit.

For instance, when the holder of the handheld unit 1 approaches the parked vehicle and the ID code collation (i.e., ID code determination) is affirmatively determined (i.e., the ID code is verified), the control unit 7 determines the position of the holder based on the response code. Further, when the holder is located outside of the vehicle, a touch switch 5 of the door handle corresponding to the determined position is supplied with an electric current to activate. This allows the detection that the holder touches the door-handle. This state is called an unlock standby state.

When one door is in the unlock standby state and it is detected that the holder touches the corresponding touch switch 5, the control unit 7 instructs each door control unit 8 to unlock the corresponding door. This allows the holder of the handheld unit 1 to unlock the doors without actually holding a vehicular key by hand and get in the vehicle.

Instead of the touch switch 5, a door handle sensor 4 for detecting that a door handle is pulled open may be used to detect that the holder operates the door handle. Thus, the touch switch 5 or door handle sensor 4, the control unit 7, and the door control unit 8 may serve as an unlock instruction unit. Further, a push-type unlock switch may be provided to a door handle. The unlock switch may be used to detect that the holder operates the door handle, similarly. Furthermore, the unlock switch may further serve as the door lock switch.

In contrast, when the door lock switch 6 provided in the door handle is operated for locking the door, the transmitter 2 transmits request signals towards outside and inside of the vehicle. The handheld unit 1 is assumed to be taken out of the vehicle by the holder when the following conditions are satisfied: (i) no response signal is replied to a request signal which is transmitted towards inside of the vehicle; and (ii) a response signal is replied to a request signal which is transmitted towards outside of the vehicle, and an ID code collation is then affirmatively determined. In this case, according to the operation of the door lock switch 6, the control unit 7 outputs an instruction signal to each door control unit 8 to lock the corresponding door. Thus, the door lock switch 6, the control unit 7, and the control unit 8 may serve as a lock instruction unit.

Further, as explained above, the vehicular control system of the embodiment includes the engine control unit 9 and the security unit 10, each of which will be explained below.

The engine control unit 9 switches permission/prohibition of the engine start therebetween based on instruction signals from the control unit 7. For instance, the holder of the handheld unit 1 opens and closes the door and gets in the vehicle. The control unit 7 then communicates with the handheld unit 1 via the transmitter 2 and receiver 3 provided inside of the vehicle and performs the ID code collation again. When the engine switch previously provided in the vehicle is operated at this time, the engine control unit 9 inquires of the control unit 7 whether the prohibition of the engine start should be released. The control unit 7 replies that the engine control unit 9 should permit the engine start when the ID code collation is affirmatively determined. The engine control unit 9 starts the engine based on the reply.

When the ID code collation is negatively determined (i.e., the ID code is not verified), the control unit 7 instructs the engine control unit 9 to prohibit the engine start. This helps prevent a person not having the handheld unit 1 from starting the engine using an unauthorized means.

In contrast, the security unit 10 is connected with an anomaly sensor 11 and an alarm unit 12. The anomaly sensor 11 includes at least one of a vibration sensor, a sound sensor, an invasion sensor. The vibration sensor is to detect vibrations arising in the parked vehicle. The sound sensor is to detect sounds resulting from glasses broken or vehicle body undergoing impact. The invasion sensor is to detect an invasion of a mobile object by transmitting ultrasonic or radio waves towards inside of the vehicle to monitor the resultant reflection. The alarm unit 12 is to output an alarm by outputting sounds or lights based on instructions from the security unit 10.

The security unit 10 determines whether a state of the parked vehicle is changed, based on the detection signal from the anomaly sensor 11. The anomaly sensor 11 is to detect that an external force is applied to the vehicle or that an invader is present inside of the vehicle. Such detection suggests an occurrence of stealing objects inside the vehicle, stealing the vehicle itself, vandalizing the vehicle, or the like, so that the security unit 10 causes the alarm unit 12 to output an alarm.

When the door lock switch 6 causes the door to lock, the control unit 7 instructs the engine control unit 9 to prohibit the engine start, and instructs the security unit 10 to start a security operation. Further, alternatively, the engine control unit 9 and/or the security unit 10 can be integrated into the control unit 7 as one unit.

Next, a control process when a door of the vehicle is locked will be explained with reference to a flowchart in FIG. 2. The control process is featured part of the vehicular control system and mainly executed by the control unit 7.

At Step S10, it is determined whether a door lock switch 6 provided in a door handle of a door is operated. When the door lock switch 6 is determined to be operated, Step S20 is performed. Here, it may be designed that when the door lock switch 6 of any one of the doors is determined to be operated, Steps S20 to S90 may be performed as interruption handling.

At Step S20, the transmitter 2 transmits a request signal towards inside and outside of the vehicle. At Step S30, it is determined whether a response signal is received from the handheld unit 1 as the reply to the request signal transmitted towards outside of the vehicle. When the response signal is determined to be received, Step S40 is performed to determine whether an ID code included in the response signal is verified or not (i.e., an ID code determination is performed). Although not shown, at the same time as Steps S30, S40 or around the time of Steps S30, S40, it is determined that there is no handheld unit 1 inside of the vehicle. This is determined by not receiving a response signal in reply to the request signal transmitted towards inside of the vehicle. When the determination at Step S40 is affirmed, Step S50 is performed.

At Step S50, a disabling process is performed for the touch switch 5 and door lock switch 6. For instance, the control unit 7 disregards operation signals from the touch switch 5 and door lock switch 6; namely, the control unit 7 does not issue an unlock instruction based on operation signals from the touch switch 5 and does not issue a lock instruction based on operation signals from the door lock switch 6. Alternatively, the touch switch 5 and lock switch 6 are supplied with no electric power; thereby, no operation signals are outputted from the touch switch 5 and door lock switch 6. Thus, the control unit 7 serves as a disabling unit.

For instance, immediately after the holder of the handheld unit 1 locks the door with the door lock switch 6, the holder may touch the door handle. In this case, when the above disabling process is effective, the door is prevented from being unlocked. In other words, even when the holder locks the door and then pulls the door handle open in order to check whether or not the door is securely locked, the door lock is prevented from being released.

At Step S60, it is determined whether an elapsed time period (i.e., disabling time period), which starts from when the disabling process is started for the touch switch 5 and lock switch 6 at Step S50, reaches a predetermined time period. When the disabling time period is determined to reach the predetermined time period, Step S90 is performed to release the disabling process performed for the touch switch 5 and lock switch 6. The predetermined time period, i.e., the maximum disabling time period, may be set to allow the holder to confirm the lock of the door.

In contrast, when the disabling time period is determined not to reach the predetermined time period at Step S60, Step S70 is performed. At Step S70, it is determined whether the holder performs a predetermined operation to the door handle.

Examples of this predetermined operation to the door handle are as follows: (i) Pulling the door handle open in the predetermined number of times; (ii) Pressing the door lock switch 6 with the door handle being pulled; and (iii) Continuing touching or pulling the door handle more than a given time period, which is shorter than the predetermined time period referred at S60. Thus, the predetermined operation to the door handle only needs to be clearly different from the operation for the holder of the handheld unit 1 to confirm the door lock. The predetermined operation can be detected from combinations of detection signals from one or more of the door handle sensor 4, touch switch 5, and lock switch 6.

When it is not determined that the holder performs a predetermined operation to the door handle at Step S70, Step S60 is performed again. When it is determined that the holder performs a predetermined operation to the door handle at Step S70, Step S80 is performed. It is designed that the predetermined operation to the door handle previously corresponds to a certain function. At Step S80, the certain function is started by the affirmative determination at Step S70. Thus, the control unit 7 serves as a function instruction unit.

As explained above, after the door is locked, the touch switch 5 and the door lock switch 6 are disabled for the predetermined time period (i.e., disabling time period). The predetermined operation to the door handle by the holder of the handheld unit 1 during the disabling time period can cause a device (e.g., touch switch 5, door lock switch 6) mounted in the vehicle to execute a certain function other than unlocking the door. In other words, the predetermined operation solely to the door handle after the door is locked can serve as an instruction for the device mounted in the vehicle to execute the certain function.

An example of the certain function is to stop a polling function of the in-vehicle system 20.

For instance, the holder of the handheld unit 1 may be located nearby the vehicle to wash or maintain the vehicle for a long time period. In this case, the transmitter 2 of the in-vehicle system 20 transmits a request signal with given intervals; the communications may be performed between the handheld unit 1 and in-vehicle system 20. In the repeatedly performed communications, the ID code collation and response code acquisition are performed. The repeatedly performed communications result in consumption of electric power in the handheld unit 1 and the in-vehicle system 20, which may exhaust the battery of the handheld unit 1 and the battery mounted in the vehicle.

To solve such problem, the polling function of the in-vehicle system 20 is stopped. This can prevent the repeatedly performed communications between the handheld unit 1 and the in-vehicle system 20, even when the holder is located nearby the vehicle. Thus, useless power consumption can be prevented in the handheld unit 1 and in-vehicle system 20.

Another example of the certain function is to stop a trigger function in addition to the polling function of the in-vehicle system 20. In this example, even when a water from the washed vehicle splashes on the door handle to activate the touch switch 5, unintentional release of the door lock can be prevented. Stopping the polling function and trigger function is equivalent to mostly or entirely stopping the corresponding operation in the in-vehicle system 20. This allows reduction of the consumed power in the in-vehicle system 20. Even when the vehicle is not used for a long time period, running out of the battery may be prevented.

Here, after the polling function and/or trigger function is stopped, the door may need to be unlocked. In this case, a vehicular key may be inserted into a key cylinder in the door and rotated to unlock. When the handheld unit 1 and in-vehicle system 20 are provided with a keyless entry function, an unlock button of the handheld unit 1 may be operated to unlock. Thus, as long as a user of the vehicle does not intentionally release the door lock, the door is never unlocked.

Yet another example of the certain function is to limit an effective handheld unit to a specific one. For instance, multiple handheld units 1 may be provided for one in-vehicle system 20. In this case, the certain function is to authorize only one handheld unit 1 to be affirmatively determined in the ID code collation. This can previously limit a user of the vehicle in consideration of a schedule in which multiple holders of the individual handheld units 1 use the vehicle. Thus, the control unit 7 serves as a handheld unit limiting unit.

To limit the effective handheld unit 1 to a specific one, for instance, when a holder of a handheld unit 1 performs the predetermined operation, the handheld unit 1, which previously undergone the affirmative determination in the ID code collation, is regarded as the effective handheld unit 1. Alternatively, a specific handheld unit may be designated based on an operation manner or the number of times in which the predetermined operation is performed to the door handle.

Further, an example of the certain function may be to stop detection by the anomaly sensor 11 and/or alarm by the security unit 10 or (the alarm unit 12). This can prevent the security unit 10 from uselessly outputting an alarm in response to sounds or vibrations normally resulting from the vehicle washed or maintained by the holder of the handheld unit 1.

Further, the certain function may be previously fixedly designated or optionally designated from the above-mentioned multiple functions.

Figure 2:
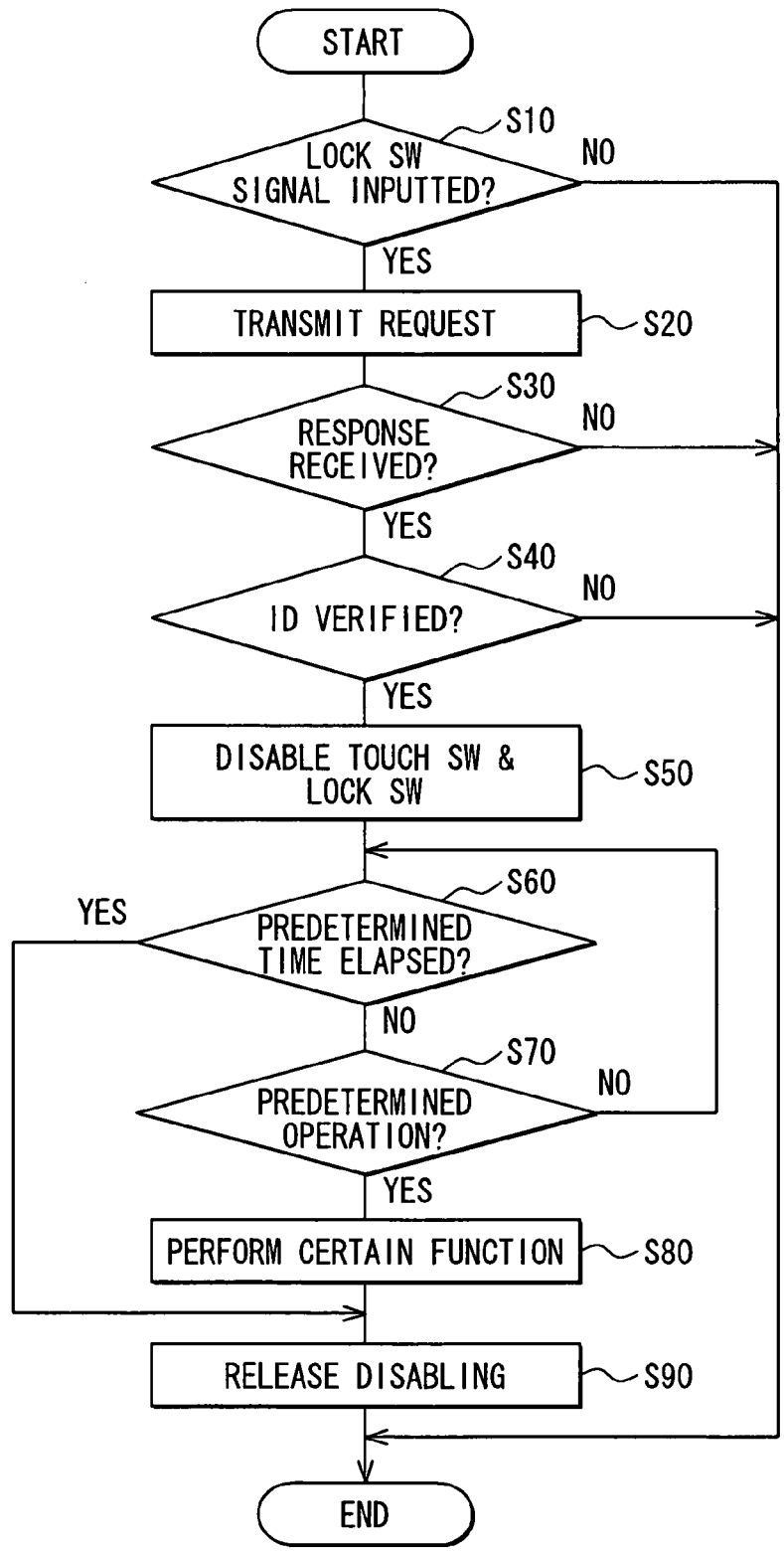
FIG. 2 is a flowchart diagram illustrating a control process taking place when a door of a vehicle is locked.

Thus, at Step S80 in FIG. 2, the certain function is performed in the device mounted in the vehicle. This may be notified the holder of the handheld unit 1 by a certain means, such as an operation of a hazard flasher by the control unit 7. Thus, the control unit 7 serves as a notification unit. The notification may be done with a buzzer or a sound. After Step S80 is terminated, Step S90 is performed to release the disabling process performed for the touch switch 5 and the door lock switch 6. Thus, the control unit 7 serves as a release unit.

(Modification)

For instance, whether the door lock switch 6 provided in the door handle of the door is operated is determined by whether an operation signal is inputted from the door lock switch 6; then the process in FIG. 2 is practically started. The process in FIG. 2 can be practically started alternatively. To start the process, for instance, the vehicular key may be mechanically inserted into a door to lock the door, or the lock button of the handheld unit having a keyless entry function is operated to unlock the door.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

According to a first aspect, a control system for a vehicle is provided with (i) an in-vehicle system provided in the vehicle and configured to transmit a request signal and (ii) a handheld unit configured to return a response signal including an ID code in response to the request signal. The in-vehicle system comprises the following: a collating unit configured to perform a collation of the ID code from the handheld unit; a lock instruction unit to be operated by a holder of the handheld unit for issuing a lock instruction to lock a door of the vehicle; an unlock instruction unit provided in a door handle of the vehicle to be operated by the holder for issuing an unlock instruction to unlock the door when the ID code is verified in the collation performed by the collating unit; a disabling unit to disable the unlock instruction issued by the unlock instruction unit from when the door is locked based on the lock instruction to when a predetermined time period elapses, the predetermined time period starting from when the door is locked based on the lock instruction; and a function instruction unit configured to (i) detect a predetermined operation to the door handle by the holder while the unlock instruction is disabled and (ii) instruct a certain device in the vehicle to execute a certain function other than unlocking the door when the predetermined operation is detected.

According to an additional aspect of the first aspect, the in-vehicle system further comprises: (i) a polling unit to execute a polling function to transmit the request signal with predetermined time intervals when the vehicle is parked, in order to detect that the handheld unit approaches the vehicle;

and (ii) a trigger unit to execute a trigger function to issue a trigger signal for the polling unit to start transmitting the request signal when the unlock instruction unit is operated by the holder. Here, the function instruction unit instructs the polling unit as the certain device to stop the polling function. In addition, the function instruction unit may further instruct the trigger unit to stop the trigger function.

According to an additional aspect of the first aspect, the control unit further includes a plurality of handheld units including the handheld unit of the first aspect. The in-vehicle system further comprises a handheld unit limiting unit configured to limit an effective handheld unit to one of the plurality of handheld units, the effective handheld unit being authorized to be verified in the collation of the ID code. The function instruction unit instructs the handheld unit limiting unit as the certain device to limit the effective handheld unit to the one of the plurality of handheld units.

According to an additional aspect of the first aspect, the in-vehicle system further comprises: (i) a detection unit to execute a first function to detect a variation in a state of the vehicle, which is parked; and (ii) a security unit to execute a second function to output an alarm when the variation in the state is detected. Here, the function instruction unit instructs the detection unit and/or the security unit, as the certain device, to execute a function to stop the first function and/or the second function.

According to an additional aspect of the first aspect, the in-vehicle system further comprises a release unit to release the unlock instruction from being disabled when the predetermined time period elapses or when the certain device is instructed to execute the certain function.

According to an additional aspect of the first aspect, the in-vehicle system further comprises a notification unit for notify that the certain function is executed when the function instruction unit instructs the certain device to execute the certain function.

According to a second aspect, a method for controlling a device provided in a vehicle cooperative with a handheld unit comprises the following steps: locking a door of the vehicle based on a lock instruction issued by a lock instruction unit and then transmitting a request signal from the vehicle to the handheld unit; receiving a response signal including an ID code in response to the request signal from the handheld unit; performing a collation of the ID code from the handheld unit; disabling an unlock instruction issued by an unlock instruction unit from when the door is locked based on the lock instruction to when a predetermined time period elapses, the predetermined time period starting from when the door is locked based on the lock instruction, the unlock instruction unit being provided in a door handle of the vehicle to be operated by the holder to issue the unlock instruction when the ID code is verified in the collation of the ID code; detecting a predetermined operation to the door handle by the holder while the unlock instruction is disabled; and instructing the device in the vehicle to execute a certain function other than unlocking the door when the predetermined operation is detected.

It will be obvious to those skilled in the art that various changes may be made in the above-described embodiments of the present invention. However, the scope of the present invention should be determined by the following claims.

What is claimed is:

1. A control system for a vehicle, the system including:
an in-vehicle system provided in the vehicle and configured to transmit a request signal; and
a handheld unit configured to return a response signal including an ID code in response to the request signal, the in-vehicle system comprising:
a collating unit configured to perform a collation of the ID code from the handheld unit;
a lock instruction unit to be operated by a holder of the handheld unit for issuing a lock instruction to lock a door of the vehicle;
an unlock instruction unit provided in a door handle of the vehicle to be operated by the holder for issuing an unlock instruction to unlock the door when the ID code is verified in the collation performed by the collating unit;
a disabling unit to disable the unlock instruction issued by the unlock instruction unit from when the door is locked based on the lock instruction to when a predetermined time period elapses, the predetermined time period starting from when the door is locked based on the lock instruction; and
a function instruction unit configured to (i) detect a predetermined operation to the door handle by the holder while the unlock instruction is disabled and (ii) instruct a certain device in the vehicle to execute a certain function other than unlocking the door when the predetermined operation is detected.

2. The control system of claim 1, wherein the in-vehicle system further comprises:
a polling unit to execute a polling function to transmit the request signal with predetermined time intervals when the vehicle is parked, in order to detect that the handheld unit approaches the vehicle; and
a trigger unit to execute a trigger function to issue a trigger signal for the polling unit to start transmitting the request signal when the unlock instruction unit is operated by the holder, wherein
the function instruction unit instructs the polling unit as the certain device to stop the polling function.

3. The control system of claim 2, wherein the function instruction unit further instructs the trigger unit to stop the trigger function.

4. The control system of claim 1, further including a plurality of handheld units including the handheld unit of claim 1, wherein
the in-vehicle system further comprises:
a handheld unit limiting unit configured to limit an effective handheld unit to one of the plurality of handheld units, the effective handheld unit being authorized to be verified in the collation of the ID code, wherein
the function instruction unit instructs the handheld unit limiting unit as the certain device to limit the effective handheld unit to the one of the plurality of handheld units.

5. The control system of claim 1, wherein the in-vehicle system further comprises:
a detection unit to execute a first function to detect a variation in a state of the vehicle, which is parked; and
a security unit to execute a second function to output an alarm when the variation in the state is detected, wherein
the function instruction unit instructs the detection unit and/or the security unit, as the certain device, to execute a function to stop the first function and/or the second function.

6. The control system of claim 1, wherein the in-vehicle system further comprises:
a release unit to release the unlock instruction from being disabled when the predetermined time period elapses or when the certain device is instructed to execute the certain function.

7. The control system of claim 1, wherein
the in-vehicle system further comprises:
a notification unit for notify that the certain function is executed when the function instruction unit instructs the certain device to execute the certain function.

8. A method for controlling a device provided in a vehicle cooperative with a handheld unit, the method comprising:
locking a door of the vehicle based on a lock instruction issued by a lock instruction unit and then transmitting a request signal from the vehicle to the handheld unit;
receiving a response signal including an ID code in response to the request signal from the handheld unit;
performing a collation of the ID code from the handheld unit;
disabling an unlock instruction issued by an unlock instruction unit from when the door is locked based on the lock instruction to when a predetermined time period elapses, the predetermined time period starting from when the door is locked based on the lock instruction, the unlock instruction unit being provided in a door handle of the vehicle to be operated by the holder to issue the unlock instruction when the ID code is verified in the collation of the ID code;
detecting a predetermined operation to the door handle by the holder while the unlock instruction is disabled; and
instructing the device in the vehicle to execute a certain function other than unlocking the door when the predetermined operation is detected.

* * * * *